US009976846B2

(12) United States Patent
Jung et al.

(10) Patent No.: US 9,976,846 B2
(45) Date of Patent: May 22, 2018

(54) DEVICE AND METHOD OF MEASURING DEFORMATION OF A GRIPPER OF A ROBOT

(71) Applicant: HYUNDAI MOTOR COMPANY, Seoul (KR)

(72) Inventors: Ki Hwan Jung, Ulsan (KR); Man Chai Han, Ulsan (KR); Jae Wan Park, Ulsan (KR)

(73) Assignee: Hyundai Motor Company, Seoul (KR)

( * ) Notice: Subject to any disclaimer, the term of this patent is extended or adjusted under 35 U.S.C. 154(b) by 310 days.

(21) Appl. No.: 14/869,274

(22) Filed: Sep. 29, 2015

(65) Prior Publication Data

US 2017/0010089 A1   Jan. 12, 2017

(30) Foreign Application Priority Data

Jul. 9, 2015  (KR) .................. 10-2015-0097973

(51) Int. Cl.
  *G01B 3/00*   (2006.01)
  *G01B 5/00*   (2006.01)
  *G01B 11/16*  (2006.01)
  *B25J 9/16*   (2006.01)

(52) U.S. Cl.
  CPC ............. *G01B 11/16* (2013.01); *B25J 9/1692* (2013.01)

(58) Field of Classification Search
  CPC .............................. G01B 11/16; B25J 9/1692
  See application file for complete search history.

(56) References Cited

U.S. PATENT DOCUMENTS

| 5,400,638 | A | 3/1995 | Kim | |
|---|---|---|---|---|
| 2005/0274208 | A1* | 12/2005 | Bader | G01B 5/146 73/865.9 |
| 2014/0067124 | A1* | 3/2014 | Williamson | G05B 19/406 700/258 |
| 2014/0347079 | A1* | 11/2014 | Min | G01R 31/001 324/750.01 |
| 2017/0266808 | A1* | 9/2017 | Alonso | B25J 9/1612 |

FOREIGN PATENT DOCUMENTS

| JP | 11-179692 | 7/1999 |
|---|---|---|
| JP | 2008-141098 | 6/2008 |
| KR | 20-0409460 | 2/2006 |
| KR | 10-2012-0138339 A | 12/2012 |
| KR | 10-2013-0128846 | 11/2013 |
| KR | 10-1370294 B1 | 3/2014 |
| KR | 10-1388226 | 4/2014 |

\* cited by examiner

*Primary Examiner* — Toan Le
(74) *Attorney, Agent, or Firm* — Brinks Gilson & Lione

(57) ABSTRACT

Disclosed herein are devices and methods for measuring deformation of a gripper of a robot. Devices for measuring deformation of a gripper of a robot include: a frame mounted in the vicinity of the robot at which the gripper taking out components is formed; a sensor block provided on the frame that is configured to sense the deformation of the gripper; and a controlling part connected to the sensor block that is configured to analyze and manage a deformation state of the gripper. A deformation state of the gripper of the robot is measured, such that a component takeout defect and component work line non-operation due to the deformation may be sensed and prevented in advance, a state of the gripper may be managed, and real-time monitoring may be possible, thereby improving work reliability and an operation rate.

8 Claims, 8 Drawing Sheets

DEVICE AND METHOD OF MEASURING DEFORMATION OF A GRIPPER OF A ROBOT

CROSS-REFERENCE TO RELATED APPLICATION

This application is based on and claims the benefit of priority to Korean Patent Application No. 10-2015-0097973, filed on Jul. 9, 2015 in the Korean Intellectual Property Office, the disclosure of which is incorporated herein in its entirety by reference.

TECHNICAL FIELD

The present disclosure relates to devices and methods for measuring deformation of a gripper of a robot, and more particularly, to devices and methods for measuring deformation of a gripper of a robot for measuring and monitoring a gripper deformation state since an operation rate is decreased due to a takeout defect occurring when the gripper of the robot taking out components is deformed.

BACKGROUND

Generally, components for a vehicle have been assembled on the spot through various work systems. Recently, components have been assembled in an assembling process line in connection with a robot, such that workability and reliability have been increased.

The robot according to the related art described above is provided with a gripper taking out components from a pallet on which the components are loaded.

However, according to the related art, over time in the assembling process, the gripper of the robot becomes deformed or damaged, such that a defect occurs at the time of taking out the components. As a result, a work line is stopped. One example of related art is Korean Utility Model Registration No. 20-0409460.

SUMMARY

The present disclosure has been made to address the above-mentioned problems occurring in the prior art while advantages achieved by the prior art are maintained intact.

An aspect of the present disclosure provides devices and methods for measuring deformation of a gripper of a robot for measuring and monitoring a gripper deformation state since an operation rate is decreased due to a takeout defect occurring when the gripper of the robot taking out components is deformed.

According to an exemplary form of the present disclosure, a device for measuring deformation of a gripper of a robot includes: a frame mounted in the vicinity of the robot at which the gripper taking out components is formed; a sensor block provided on the frame that is configured to sense the deformation of the gripper; and a controlling part connected to the sensor block that is configured to analyze and manage a deformation state of the gripper.

The sensor block may include: a plate provided on the frame; a plurality of laser displacement sensors provided on the plate that are configured to sense the deformation of the gripper; and a plurality of brackets fixing the respective laser displacement sensors to an upper surface of the frame.

The sensor block may further include a fixing plate mounting the laser displacement sensors on the brackets.

An outer side of the laser displacement sensor may be provided with a cover covering the laser displacement sensor to improve a measurement precision at the time of sensing the deformation of the gripper.

The sensor block may further include a plurality of sensor controllers connected to the laser displacement sensors and mounted on the brackets, respectively, that are configured to generate deformation data of the gripper sensed by the laser displacement sensors as analog signals.

The controlling part may include: a converting part connected to the sensor controller that is configured to convert the analog signal of the sensor controller into a digital signal; a calculating part connected to the converting part that is configured to calculate the digital signal as a data value; and an output part connected to the calculating part that is configured to make and display data on the calculated data value so as to analyze and manage the deformation state of the gripper.

Measurement of the deformation of the gripper through the laser displacement sensors may be performed by measuring distances between the laser displacement sensors and the gripper, and the distances between the laser displacement sensors and the gripper may be measured in three directions of x, y, and z.

A deformation degree of the gripper may be decided depending on a difference between a measured value and a reference value between the laser displacement sensors and the gripper.

The laser displacement sensors may measure deformation amounts of a plurality of portions of the gripper.

According to another exemplary form of the present disclosure, a device for measuring deformation of a gripper of a robot includes: a frame mounted in the vicinity of the robot at which the gripper taking out components is formed; a sensor block including a plurality of laser displacement sensors provided on a plate provided on the frame and configured to sense the deformation of the gripper and a plurality of brackets fixing the respective laser displacement sensors to an upper surface of the frame; and a controlling part including a converting part connected to the laser displacement sensors and mounted at each of the brackets that are configured to convert deformation data of the gripper sensed by the laser displacement sensors into a digital signal through an analog signal, a calculating part connected to the converting part that is configured to calculate the digital signal as a data value, and an output part connected to the calculating part that is configured to make and display data on the calculated data value so as to analyze and manage a deformation state of the gripper.

According to still another exemplary form of the present disclosure, a method for measuring deformation of a gripper of a robot using the device of measuring deformation of a gripper of a robot as described above includes: a first step of operating a test of the gripper by operating a touch screen connected to the output part of the controlling part through the output part; a second step of measuring a deformation amount of the gripper through the sensor block; and a third step of making and displaying data on the deformation amount of the gripper measured in the second step through the controlling part.

A case in which the difference between the measured value and the reference value as a measurement result of the deformation amount of the gripper is 3 mm or less may be set to success, a case in which the difference between the measured value and the reference value as a measurement result of the deformation amount of the gripper is 3 mm to 5 mm may be set to warning, and a case in which the difference between the measured value and the reference value as a measurement result of the deformation amount of the gripper exceeds 5 mm may be set to failure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
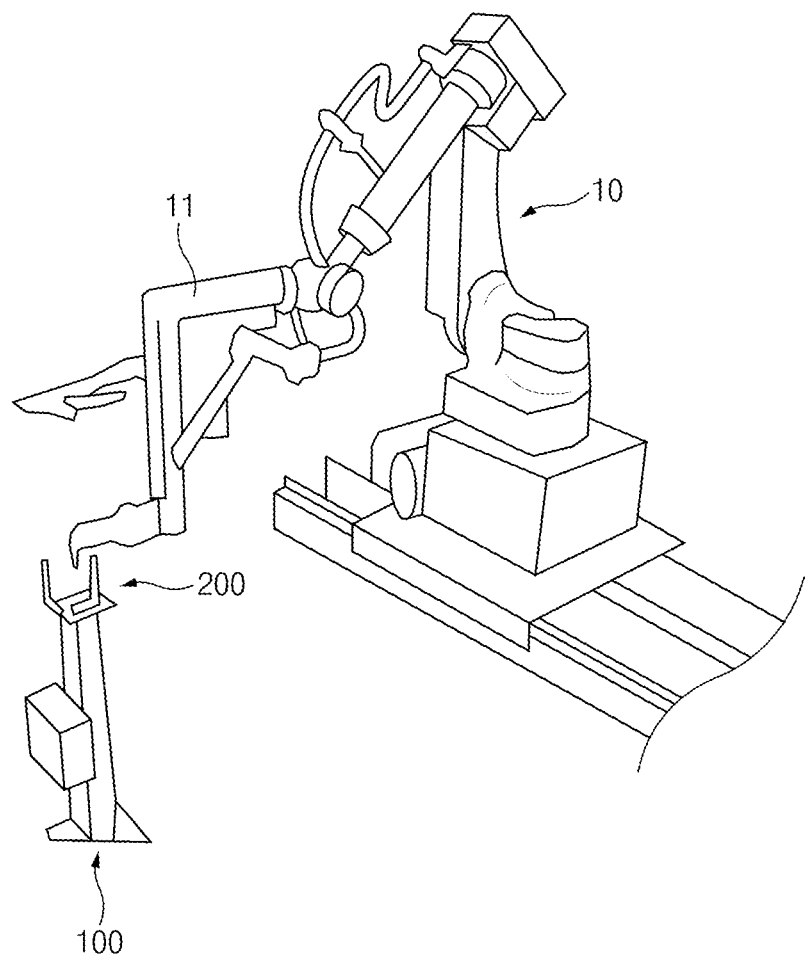
FIG. 1 is a view illustrating a device for measuring deformation of a gripper of a robot.

Exemplary forms of the present disclosure will be described in detail with reference to the accompanying drawings.

A device for measuring deformation of a gripper of a robot according to an exemplary form of the present disclosure is configured to include a frame 100 mounted in the vicinity of a palletizing robot 10 including a gripper 11, a sensor block 200 provided on the frame 100 that is configured to sense deformation of the gripper 11, and a controlling part 300 that is configured to analyze and manage the deformation of the gripper 11 sensed through the sensor block 200, as illustrated in FIGS. 1 to 7.

First, the present disclosure in which takeout of components through the palletizing robot 10 is performed by the gripper 11 provided in the robot 10 relates to a device of measuring deformation of the gripper 11 of the robot 10 for confirming whether or not the gripper 11 is deformed before a component takeout defect occurs. As illustrated in FIG. 1, the frame 100 corresponding to a body may be mounted in the vicinity of the palletizing robot 10.

Figure 2:
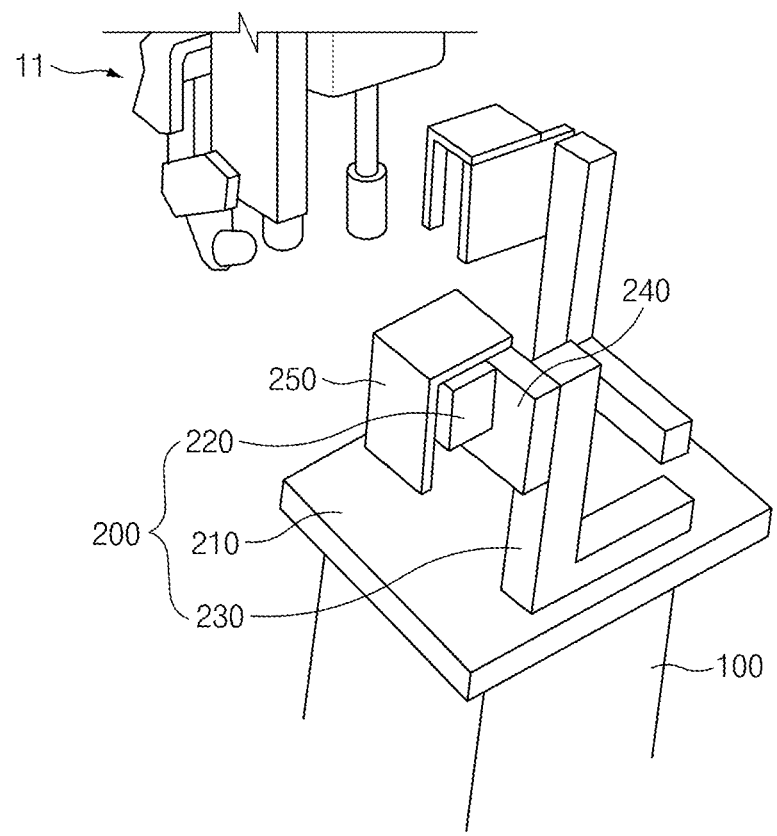
FIG. 2 is a view illustrating a sensor block in the device for measuring deformation of a gripper of a robot.
Figure 3:
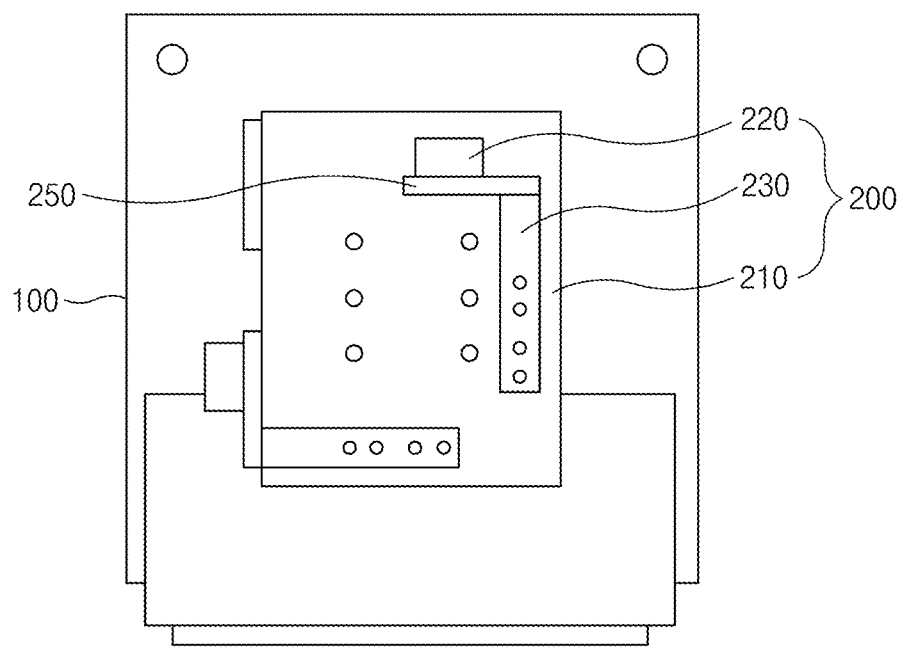
FIG. 3 is a plan view illustrating the sensor block in the device for measuring deformation of a gripper of a robot.
Figure 4:
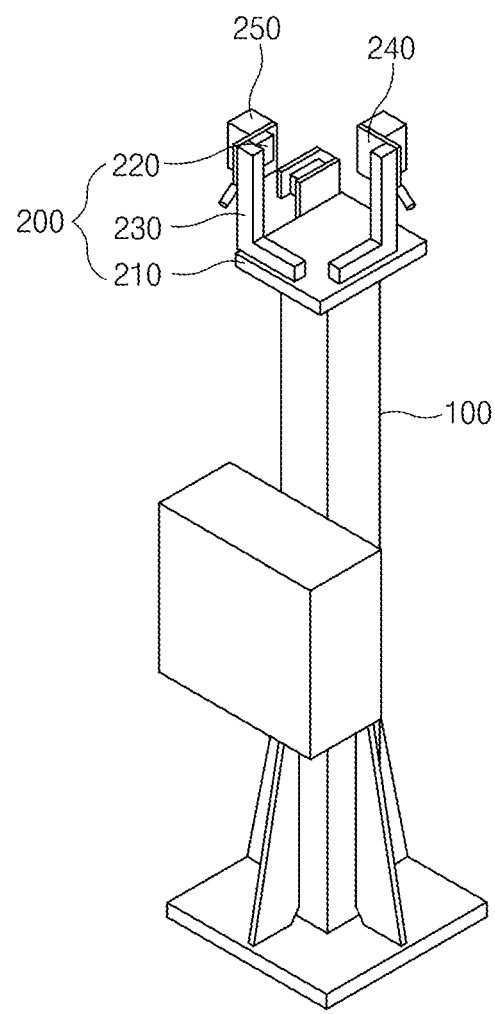
FIG. 4 is a view illustrating a frame and the sensor block in the device for measuring deformation of a gripper of a robot.

As illustrated in FIGS. 1 and 2, the sensor block 200, which is a component sensing the deformation of the gripper 11, is mounted on the frame 100.

Figure 5:
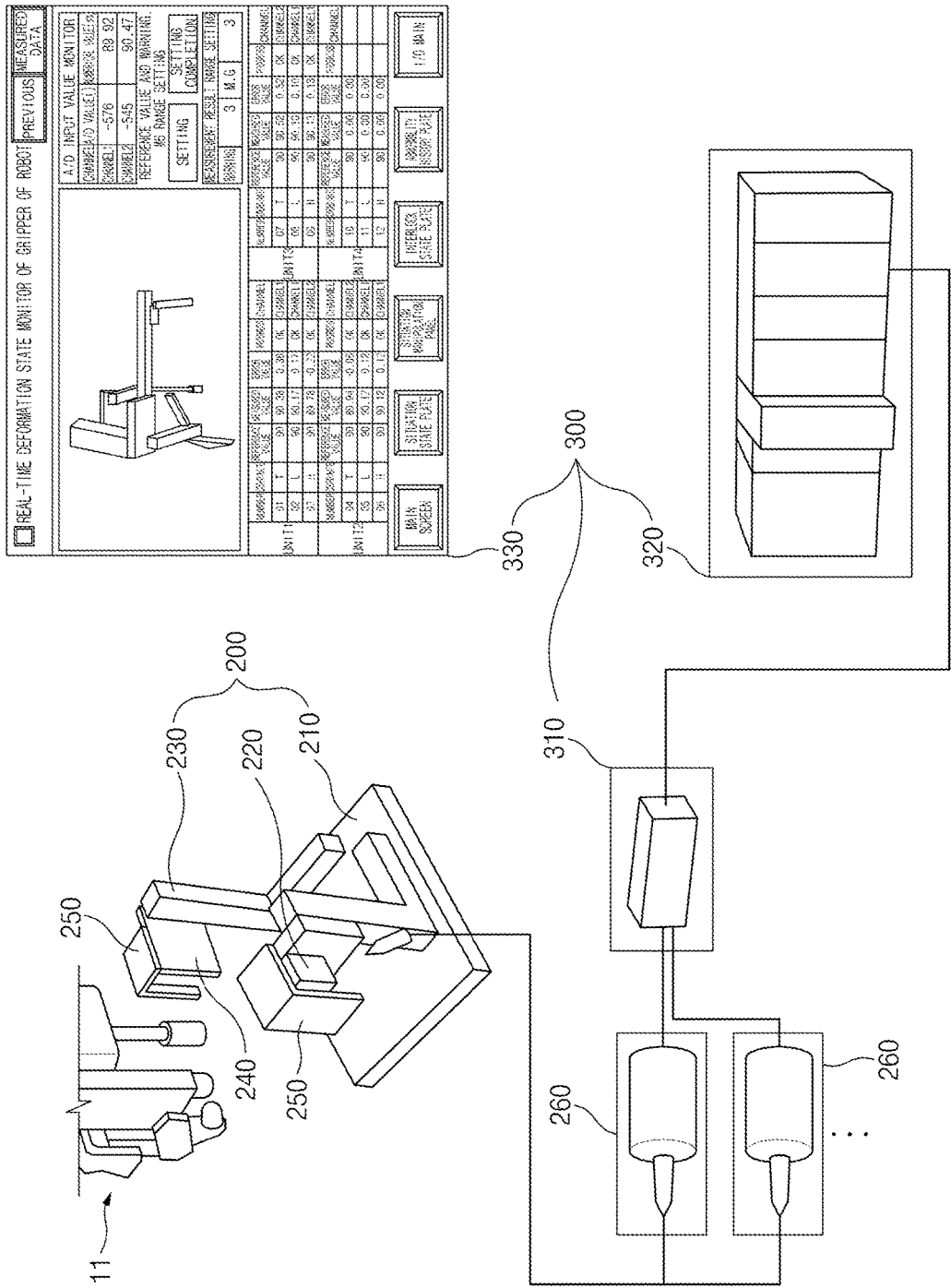
FIG. 5 is a view illustrating a controlling part connected to the sensor block in the device for measuring deformation of a gripper of a robot.

As illustrated in FIG. 5, the controlling part 300 is connected to the sensor block 200 and analyzes and manages a deformation state of the gripper 11.

Here, the sensor block 200 is configured to include a plate 210 provided on the frame 100, laser displacement sensors 220 sensing the deformation of the gripper 11, and brackets 230 fixing the laser displacement sensors 220, as illustrated in FIGS. 2 to 5.

A plurality of laser displacement sensors 220 are provided on the plate 210 that are configured to sense the deformation of the gripper 11.

In addition, it is preferable that the number of brackets 230, which fix the respective laser displacement sensors 220 to an upper surface of the frame 100, is plural.

Here, the brackets 230 of the sensor block 200 may be provided with a fixing plate 240 to improve fixing force at the time of mounting the laser displacement sensors 220 on the brackets 230.

Meanwhile, it is preferable that an outer side of the laser displacement sensor 220 is provided with a cover 250 covering the laser displacement sensor 220 to improve a measurement precision at the time of sensing the deformation of the gripper 11.

In addition, the sensor block 200 includes sensor controllers 260 generating a deformation degree of the gripper 11 as analog signals, as illustrated in FIG. 5.

Here, a plurality of sensor controllers 260 are provided, are connected to the laser displacement sensors 220, and are mounted on the brackets 230, respectively, to generate deformation data of the gripper 11 sensed by the laser displacement sensors 220 as the analog signals.

Figure 6:
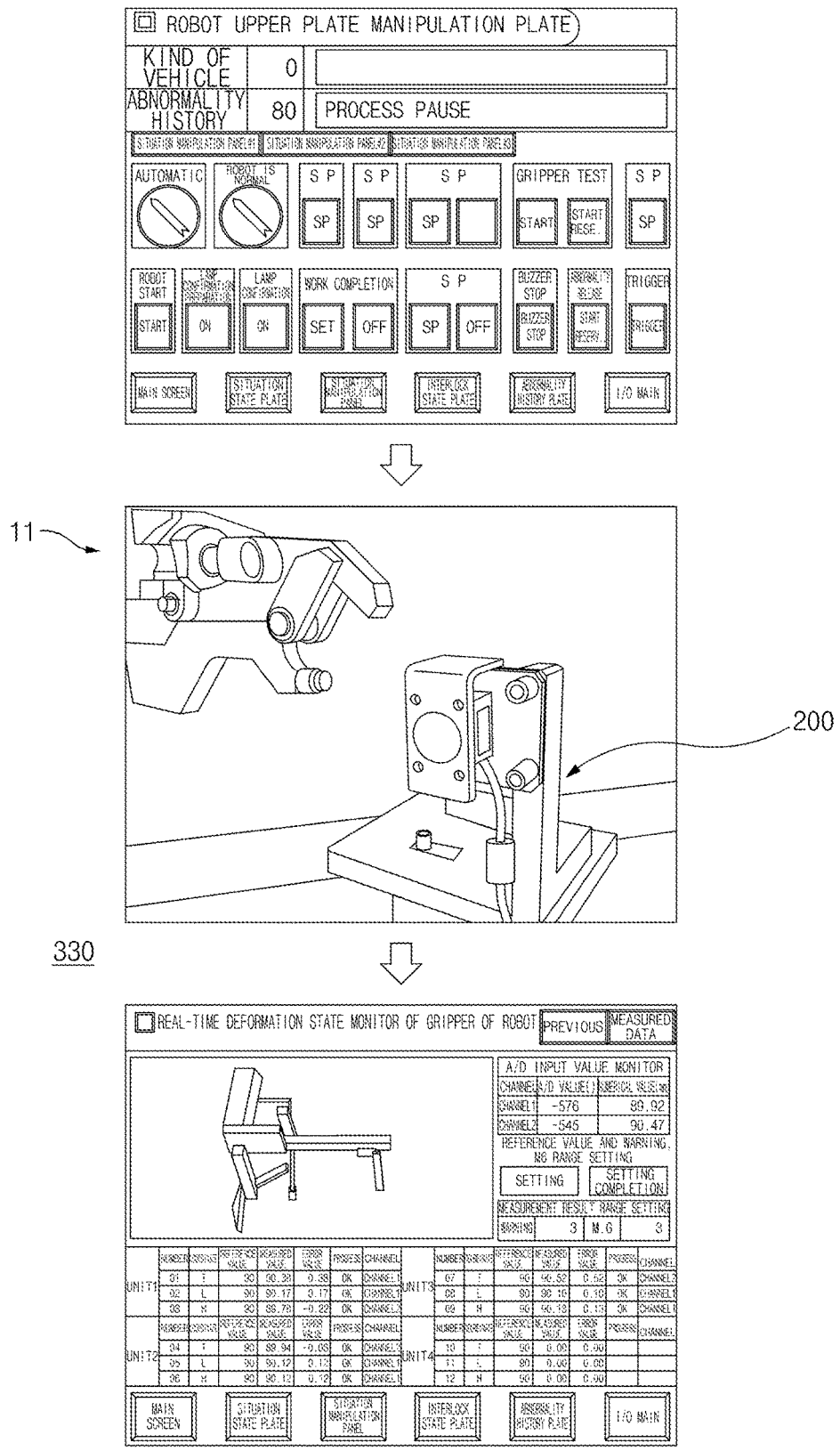
FIG. 6 is a view illustrating operation steps of the device for measuring deformation of a gripper of a robot.

Meanwhile, the controlling part 300, which is a component connected to the sensor block 220 to analyze and manage the deformation state of the gripper 11, as illustrated in FIGS. 5 and 6, is configured to include a converting part 310 configured to convert a signal, a calculating part 320 configured to calculate the converted signal as data, and an output part 330 configured to display the deformation state of the gripper 11 through the calculated data.

The converting part 310 is connected to the sensor controller 260 to convert the analog signal of the sensor controller 260 into a digital signal.

The calculating part 320 is connected to the converting part 310 to calculate the digital signal obtained through the converting part 310 as a data value.

The output part 330 is connected to the calculating part 320 to numerically make and display data on the calculated data value so as to analyze and manage the deformation state of the gripper 11.

Meanwhile, the measurement of the deformation of the gripper 11 through the laser displacement sensors 220 is performed by measuring distances between the laser displacement sensors 220 and the gripper 11, and the distances between the laser displacement sensors 220 and the gripper 11 are measured in three directions (x, y, and z or T, L, and H), thereby making it possible to improve accuracy in measuring the deformation of the gripper 11.

Here, a deformation degree of the gripper 11 may be decided depending on a difference between a measured value and a reference value between the laser displacement sensors 220 and the gripper 11. That is, it is preferable that in the case in which the difference between the measured value and the reference value is 3 mm or less as a measurement result of a deformation amount of the gripper 11, it is decided that the deformation of the gripper 11 is not problematic, such that an operation of the robot 10 may be continuously performed. In the case in which the difference is 3 mm to 5 mm, the operation of the robot 10 is performed, but a problem may be present later in taking out the components due to the deformation of the gripper 11, such that this fact is warned and managed. In the case in which the difference exceeds 5 mm, a problem is present in taking out the components due to the deformation of the gripper 11, such that it is decided that the gripper 11 fails, thereby stopping the operation of the robot 10.

Figure 7:
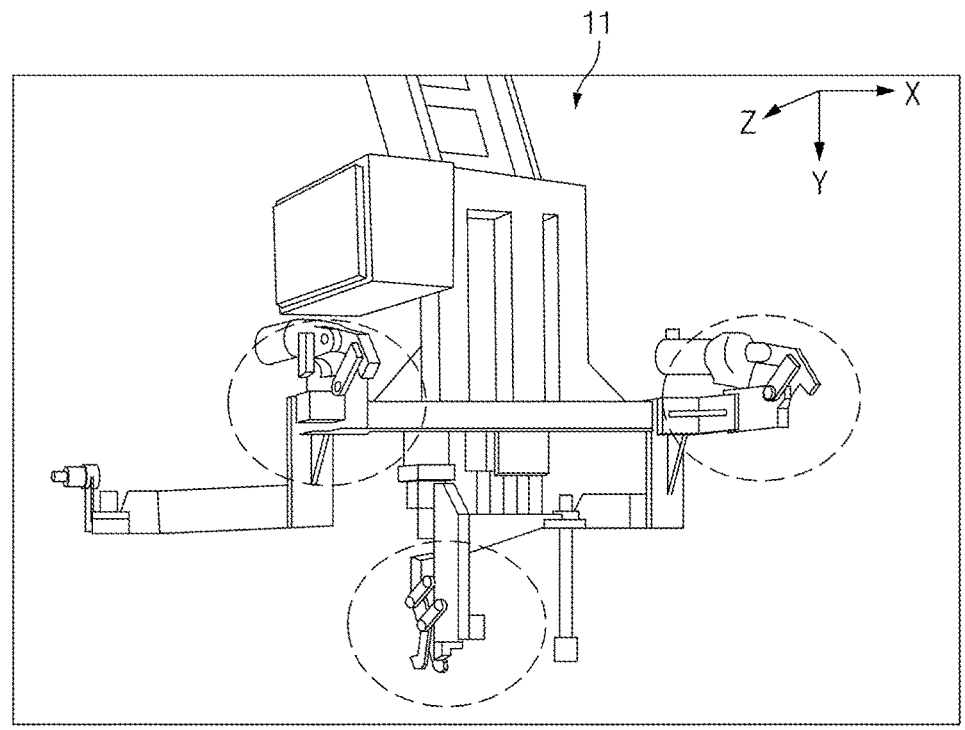
FIG. 7 is a view illustrating a deformation amount measuring portion of the gripper in the device for measuring deformation of a gripper of a robot.

Here, the laser displacement sensors 220 measure deformation amounts of a plurality of portions of the gripper 11 to allow the entire gripper 11 to be sensed, as illustrated in FIG. 7.

As described above, the device of measuring deformation of a gripper of a robot according to an exemplary form of the present disclosure is configured to include the frame 100, the sensor block 200, and the controller part 300. The frame 100 is mounted in the vicinity of the palletizing robot 10 at which the gripper 11 taking out the components is formed. The sensor block 200 includes the plurality of laser displacement sensors 220 provided on the plate 210 provided on the frame 100 to sense the deformation of the gripper 11 and the plurality of brackets 230 fixing the respective laser displacement sensors 220 to the upper surface of the frame 100. The controlling part 300 includes the converting part 310 connected to the laser displacement sensors 220 and mounted at each of the brackets 230 to convert the deformation data of the gripper 11 sensed by the laser displacement sensors 220 into the digital signal through the analog signal, the calculating part 320 connected to the converting part 310 to calculate the digital signal as the data value, and the output part 330 connected to the calculating part 320 to make and display the data on the calculated data value so as to analyze and manage the deformation state of the gripper 11. Therefore, in devices for measuring deformation of a gripper of a robot according to an exemplary form of the present disclosure, the deformation state of the gripper 11 of the robot 10 is measured, such that a component takeout defect and component work line non-operation due to the deformation may be sensed and prevented in advance, the state of the gripper 11 may be managed, and real-time monitoring may be possible, thereby improving work reliability and an operation rate.

Figure 8:
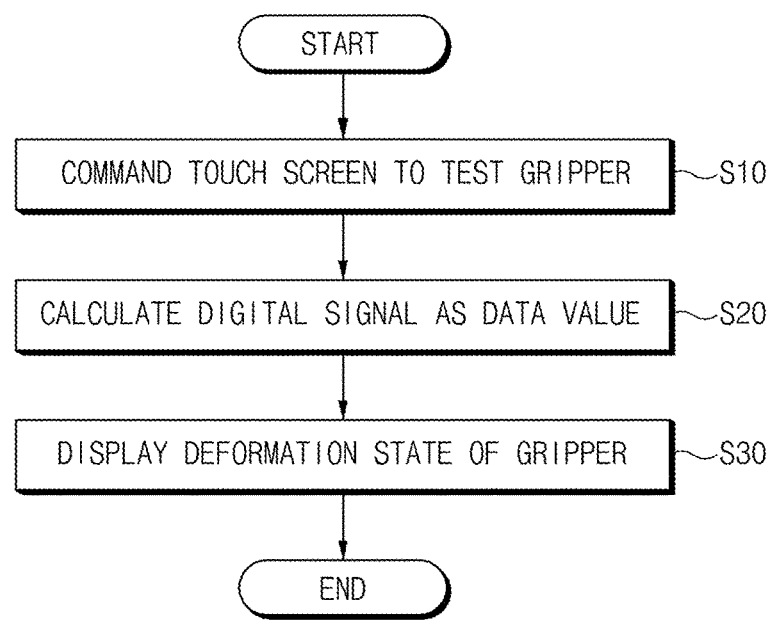
FIG. 8 is a flow chart illustrating a method of measuring deformation of a gripper of a robot.

In addition, a method of measuring deformation of a gripper of a robot according to an exemplary form of the present disclosure, which is a method for measuring deformation of a gripper through the device of measuring deformation of a gripper of a robot, includes a first step (S10) of operating a test of the gripper 11 by operating a touch screen, a second step (S20) of measuring a deformation amount of the gripper 11, and a third step (S30) of displaying a deformation amount, as illustrated in FIG. 8. Meanwhile, a configuration of the device of measuring deformation of a gripper of a robot 10 has been described with reference to FIGS. 1 to 7.

In the first step (S10), which is a step of operating an amount of deformation measuring test of the gripper 11 through the touch screen, the amount of deformation of the gripper 11 starts to be measured by operating the touch screen of the output part 330 connected to the output part 330 of the controlling part 300.

In the second step (S20), which is a step of measuring the amount of deformation of the gripper 11, distances between the laser displacement sensors 220 and the gripper 11 are measured through the sensor block 200 when it is commanded to measure the amount of deformation of the gripper 11 in the first step (S10).

In the third step (S30), which is a step of displaying the deformation amount of the gripper 11, the distances between the laser displacement sensors 220 and the gripper 11 measured in the second step (S20) are made as data on the deformation amount of the gripper 11 through the controlling part 300 and are displayed, thereby making it possible to confirm a deformation degree of the gripper 11.

Here, in the case in which the difference between the measured value and the reference value is 3 mm or less as a measurement result of a deformation amount of the gripper 11, it is decided that the deformation of the gripper 11 is not problematic, such that an operation of the robot 10 may be continuously performed. In the case in which the difference is 3 mm to 5 mm, the operation of the robot 10 is performed, but a problem may be present later in taking out the components due to the deformation of the gripper 11, such that this fact is warned and managed. In the case in which the difference exceeds 5 mm, a problem is present in taking out the components due to the deformation of the gripper 11, such that it is decided that the gripper 11 fails, thereby stopping the operation of the robot 10.

As described above, the method of measuring deformation of a gripper of a robot according to an exemplary form of the present disclosure includes the first step (S10) of operating the test of the gripper 11 by operating the touch screen connected to the output part 330 of the controlling part 300 through the output part 330, the second step (S20) of measuring the amount of deformation of the gripper 11 through the sensor block 200, and the third step (S30) of making and displaying the data on the amount of deformation of the gripper 11 measured in the second step (S20) through the controlling part 300. Therefore, in the method of measuring deformation of a gripper of a robot according to an exemplary form of the present disclosure, the deformation state of the gripper 11 of the robot 10 is measured, such that a component takeout defect and component work line non-operation due to the deformation may be sensed and prevented in advance, the state of the gripper 11 may be managed, and real-time monitoring may be possible, thereby improving work reliability and an operation rate.

As described above, according to exemplary forms of the present disclosure, the deformation state of the gripper of the robot is measured, such that the component takeout defect and the component work line non-operation due to the deformation may be sensed and prevented in advance, the state of the gripper may be managed, and the real-time monitoring may be possible, thereby improving the work reliability and the operation rate.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for measuring deformation of a gripper of a robot, comprising:
   a frame mounted in the vicinity of the robot at which the gripper taking out components is formed;
   a sensor block positioned on the frame, the sensor block comprising:
   a plate positioned on the frame;
   a plurality of laser displacement sensors positioned on the plate and configured to sense the deformation of the gripper, wherein an outer side of each laser displacement sensor includes a cover covering a respective laser displacement sensor to improve a measurement precision when sensing the deformation of the gripper; and
   a plurality of brackets fixing the respective laser displacement sensors to an upper surface of the frame; and
   a controlling part connected to the sensor block that is configured to analyze and manage a deformation state of the gripper.

2. The device for measuring deformation of a gripper of a robot according to claim 1, wherein the sensor block further includes a fixing plate mounting the laser displacement sensors on the brackets.

3. The device for measuring deformation of a gripper of a robot according to claim 1, wherein the sensor block further includes a plurality of sensor controllers connected to the laser displacement sensors and mounted on the brackets, respectively, that are configured to generate deformation data of the gripper sensed by the laser displacement sensors as analog signals.

4. The device for measuring deformation of a gripper of a robot according to claim 3, wherein the controlling part includes:
 a converting part connected to the sensor controller that is configured to convert the analog signal of the sensor controller into a digital signal;
 a calculating part connected to the converting part that is configured to calculate the digital signal as a data value; and
 an output part connected to the calculating part that is configured to make and display data on the calculated data value so as to analyze and manage the deformation state of the gripper.

5. The device for measuring deformation of a gripper of a robot according to claim 1, wherein measurement of the deformation of the gripper through the laser displacement sensors is performed by measuring distances between the laser displacement sensors and the gripper, and the distances between the laser displacement sensors and the gripper are measured in three directions of x, y, and z.

6. The device for measuring deformation of a gripper of a robot according to claim 5, wherein a deformation degree of the gripper is decided depending on a difference between a measured value and a reference value between the laser displacement sensors and the gripper.

7. The device for measuring deformation of a gripper of a robot according to claim 1, wherein the laser displacement sensors are configured to measure deformation amounts of a plurality of portions of the gripper.

8. A device for measuring deformation of a gripper of a robot, comprising:
 a frame mounted in the vicinity of the robot at which the gripper taking out components is formed;
 a sensor block comprising:
  a plurality of laser displacement sensors positioned on a plate positioned on the frame, the plurality of laser displacement sensors configured to sense the deformation of the gripper, wherein an outer side of each laser displacement sensor includes a cover covering a respective laser displacement sensor to improve a measurement precision when sensing the deformation of the gripper; and
  a plurality of brackets fixing the respective laser displacement sensors to an upper surface of the frame; and
 a controlling part comprising:
  a converting part connected to the laser displacement sensors and mounted at each of the plurality of brackets, wherein the converting part is configured to convert deformation data of the gripper sensed by one or more of the plurality of laser displacement sensors into a digital signal through an analog signal;
  a calculating part connected to the converting part, wherein the calculating part is configured to calculate the digital signal as a data value; and
  an output part connected to the calculating part, wherein the output part is configured to make and display data on the calculated data value so as to analyze and manage a deformation state of the gripper.

* * * * *